July 2, 1929.  H. E. WETHERBEE ET AL  1,719,154
PRISM FOR GLARE SHIELDS AND METHOD OF USING SAME
Filed Oct. 28, 1927
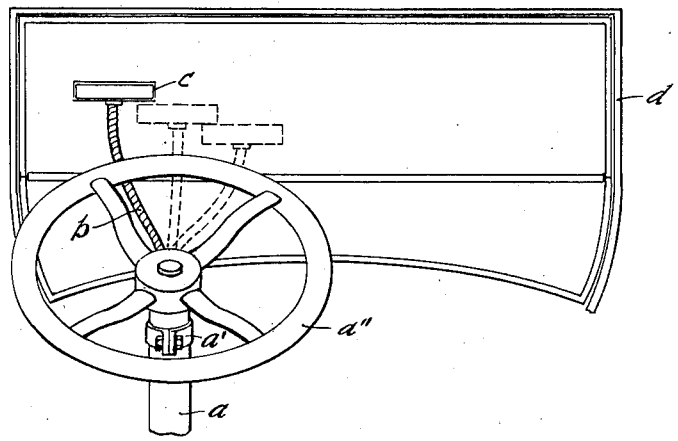
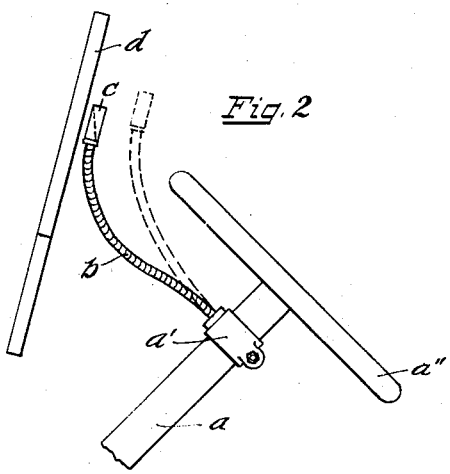
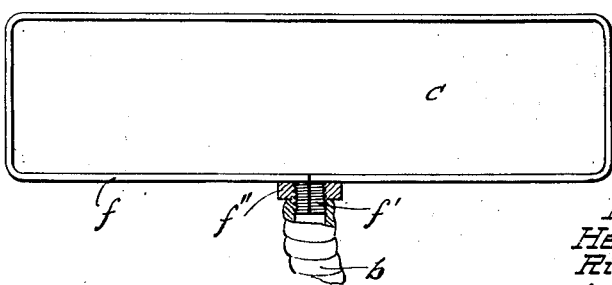
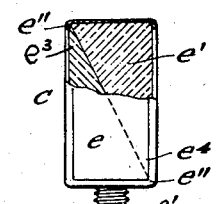
Inventors:
Herbert E. Wetherbee,
Richard F. Grant
Attorney.

Patented July 2, 1929.

1,719,154

UNITED STATES PATENT OFFICE.

HERBERT E. WETHERBEE AND RICHARD F. GRANT, OF CLEVELAND, OHIO, ASSIGNORS OF ONE-THIRD TO HOWARD M. HANNA, OF CLEVELAND, OHIO.

PRISM FOR GLARE SHIELDS AND METHOD OF USING SAME.

Application filed October 28, 1927. Serial No. 229,410.

This invention relates to shields of the character designed to protect the eyes of the driver of a vehicle against the glare produced by the lamps of a vehicle traveling in the opposite direction or any other source of light that may be in the line of vision of the driver.

An object of the invention is to shield the eyes of the driver from the glare while at the same time permitting practically unobstricted vision without distortion.

A more general object is to provide entirely unobstructed vision without distortion at all times when the user does not desire to avail of the shield or optical "curtain" obtainable with our improvement.

Various devices have heretofore been tried to accomplish the above objects, some of which use the light deflecting power of single glass prisms. These devices fail in practical use as they either distort vision when placed so they may be seen through or at other angles entirely stop vision.

The device herein described employs the principle of the reflecting and refracting power of two complementary prisms which permit clear vision without distortion when properly placed in the normal line of vision and which, by slight change of the line of vision by lowering the elevation of the eyes, will provide a partial or complete screen for the eyes of width sufficient to eliminate all glare.

These functions, it should be explained, are attained by the coaction of two suitable complementary prisms separated by an air film between their angular faces, whereby they are made capable of permitting the transmission of light in the vision position of the shield while causing a shading or "curtain" to appear as the angle of vision is slightly altered. This result is accomplished, as hereinafter explained, by effecting the relatively transverse movement of the complementary prisms with respect to the line of vision.

The structural features of a glare shield embodying our invention may best be explained by referring to the accompanying drawings, wherein:

Figure 1 is a view in rear elevation of the glare shield as applied to the steering post of an automobile, Fig. 2 is a view thereof in side elevation, Fig. 3 is an enlarged view of the glare shield in front elevation, and Fig. 4 is a transverse sectional view thereof.

Throughout the figures of the drawings we have employed the same character of reference to indicate similar parts.

Preferably, the glare shield is applied to the steering post $a$ of an automobile by means of a split collar $a'$ and a flexible standard $b$, formed of double spiral coiled metal. As shown by the dotted lines, the shield $c$ at the end of said standard may be adjusted to any desired position, merely by flexing said standard. Usually it occupies a position intermediate of the wind shield $d$ and the steering wheel $a''$ to suit the convenience and height of the driver.

The precise details of the complementary prisms, as explained herein are relatively unimportant, but may be referred to in explanation of our improvement. Thus referring to Fig. 4, it is seen that the shield $c$ comprises essentially two 30° prisms $e, e'$, which advantageously are slightly separated to preserve the air film as by introducing a thin ribbon of paper $e''$ between their adjacent edges or ends.

These prisms may conveniently be mounted in a thin sheet metal frame $f$ peripherally embracing their edges and held firmly thereon by means of the split threaded stem $f'$ and nut $f''$ terminating the standard $b$.

It should be explained that by reducing the acute angle $e^3$ a wider shield may be produced, and it is preferable to place this acute angle of the outer prism away from the driver's eyes, i. e., with the corresponding acute angle $e^4$ of the corrective prism $e'$ positioned at the bottom of the shield.

When mounted in the manner explained and adjusted in accordance with the individual requirements of the driver, he is normally afforded a clear and undistorted view of the road. However, by merely lowering his gaze and slightly altering the angle of vision, he will cause a shield or optical "curtain" to be interposed between his eyes and an on-coming light which will completely prevent any glare from reaching his eyes.

This effect may be modified from clear vision through partially obscuring the light to its complete elimination by reason of the refractive and reflecting effect of the complementary prisms.

In explanation of this effect, we may point out that light is refracted in passing from one medium to another of different density, and the amount of refraction or deviation depends upon the character of the media through which the light passes. In other words, the velocity of light is different in different media; the denser the medium in question, the less its velocity, hence the instant importance of our air film between the prisms and the avoidance of their optical contact. In our appliance the light is refracted or bent out of its course in passing from the forward prism into the intermediate film of air separating the prisms. The amount of this deviation is very much greater than would be the case if the prisms were in optical contact, as by an interposed film of transparent cement or liquid.

It is well understood that the amount of light reflected from a glass surface depends upon the angle of incidence, and that at grazing incidence practically all of the light is reflected. With our appliance, when the glare shield is properly adjusted, practically all of the light is reflected from the forward surface of the rear prism when the user drops his line of vision to the dark, or "curtain" producing position.

Under these circumstances, all of the light from the first prism is refracted into the air film intermediate of the prisms in such direction, with respect to the line of vision, as to be partially or totally reflected along the plane of separation. In normal use, however, these complementary prisms serve correctively to transmit the light and images undistorted, when viewed above the critical or "curtaining" line of vision.

As a distinctive explanation of our novel effect we may refer further to interference bands or fringes, which as is well known, are produced when two prisms are separated at their complementary faces by exceedingly thin films of air. These bands or fringes produced by very thin air films will occur at what we term the vision position of the prisms, and if not effectually disposed of they will impair the clear vision preferable in the vision position of the prisms. Said bands and fringes, however, may be totally eliminated at the vision position of the prisms by providing an air film or separation between the prisms of sufficient thickness to eliminate them.

We will not attempt herein to describe the causes of such bands and fringes, as detailed discussion thereof may be found in standard works on optics. However, we believe that we are the first practically to apply the provision of a substantial air film between the complemental prisms to eliminate the bands and fringes and produce clear vision in one position, and the "curtain" effect on lines of vision at and below the critical angle, and we have based our construction on the principle or principles referred to. Accordingly, our claims, in specifying the air film between the prisms should be read and understood as preferably defining a separation of said prisms of sufficient extent to eliminate diffraction and interference bands and fringes in the vision position of the device.

Having now described the preferred embodiment of our invention, we claim as new and desire to secure by Letters Patent the following:

1. A glare shield comprising two complementary clear glass prisms separated by an air film, located in the line of vision of the driver, whereby clear vision or an optical "curtain" alternatively is obtainable with the shifting of the direction of vision therethrough, substantially as set forth.

2. A glare shield for vehicles comprising two complementary prisms separated by an air film and means for adjustably positioning the same between the road and the eye of the driver, whereby clear vision or an optical "curtain" alternatively is obtainable with the shifting of the direction of vision therethrough, substantially as set forth.

3. A glare shield for vehicles comprising complementary clear glass prisms separated by an air film and an adjustable support therefor adapted to be secured upon a member of the vehicle, whereby clear vision or an optical "curtain" alternatively is obtainable with the shifting of the direction of vision therethrough, substantially as set forth.

4. The combination with a windshield for vehicles, of a combined clear vision and glare shield comprising complementary prisms separated by an air film, and means for adjustably mounting said shield intermediately of the windshield and the line of vision of the driver, whereby clear vision or an optical "curtain" alternatively is obtainable with the shifting of the direction of vision therethrough, substantially as set forth.

5. A new article of manufacture, comprising two substantially complementary clear vision prisms mounted with an intervening air space separating their opposing complemental faces, whereby clear vision or an optical "curtain" alternatively is obtainable with the shifting of the direction of vision therethrough, substantially as set forth.

6. The herein described method of producing an optical "curtain", which consists in positioning two substantially complementary clear vision prisms with an intervening air space separating their opposing complemental faces, interposing said complementary prisms in the line of vision, and effecting the relative movement of said prisms with respect to said line of vision, whereby partial or complete opacity is obtained in the form of an optical "curtain", substantially as set forth.

7. The herein described method of effecting an optical shielding or "curtain", which consists in positioning two similar clear glass prisms with an intervening air film separating their opposing complemental faces, interposing these complementary prisms in the line of vision, and effecting the relative transverse movement of said prisms with respect to the line of vision, whereby a shielding effect or "curtain" is obtained, substantially as set forth.

8. A new article of manufacture, comprising two substantially complementary sharply acute-angled optical clear glass prisms mounted with an intervening air film separating their opposing angular faces, whereby clear vision or an optical "curtain" alternatively is obtainable with the shifting of the direction of vision therethrough, substantially as set forth.

9. The herein described method of changing from clear vision to an optical screening effect, which consists in disposing two sharply acute-angled complementary optical prisms with an intervening air film separating their complemental faces, interposing said prisms in the line of vision with their bases approximately parallel therewith, and effecting the angular change in the line of vision therethrough below the critical plane, whereby partial or complete opacity is effected, substantially as set forth.

In testimony whereof we do now affix our signatures.

HERBERT E. WETHERBEE.
RICHARD F. GRANT.